Figure 1:
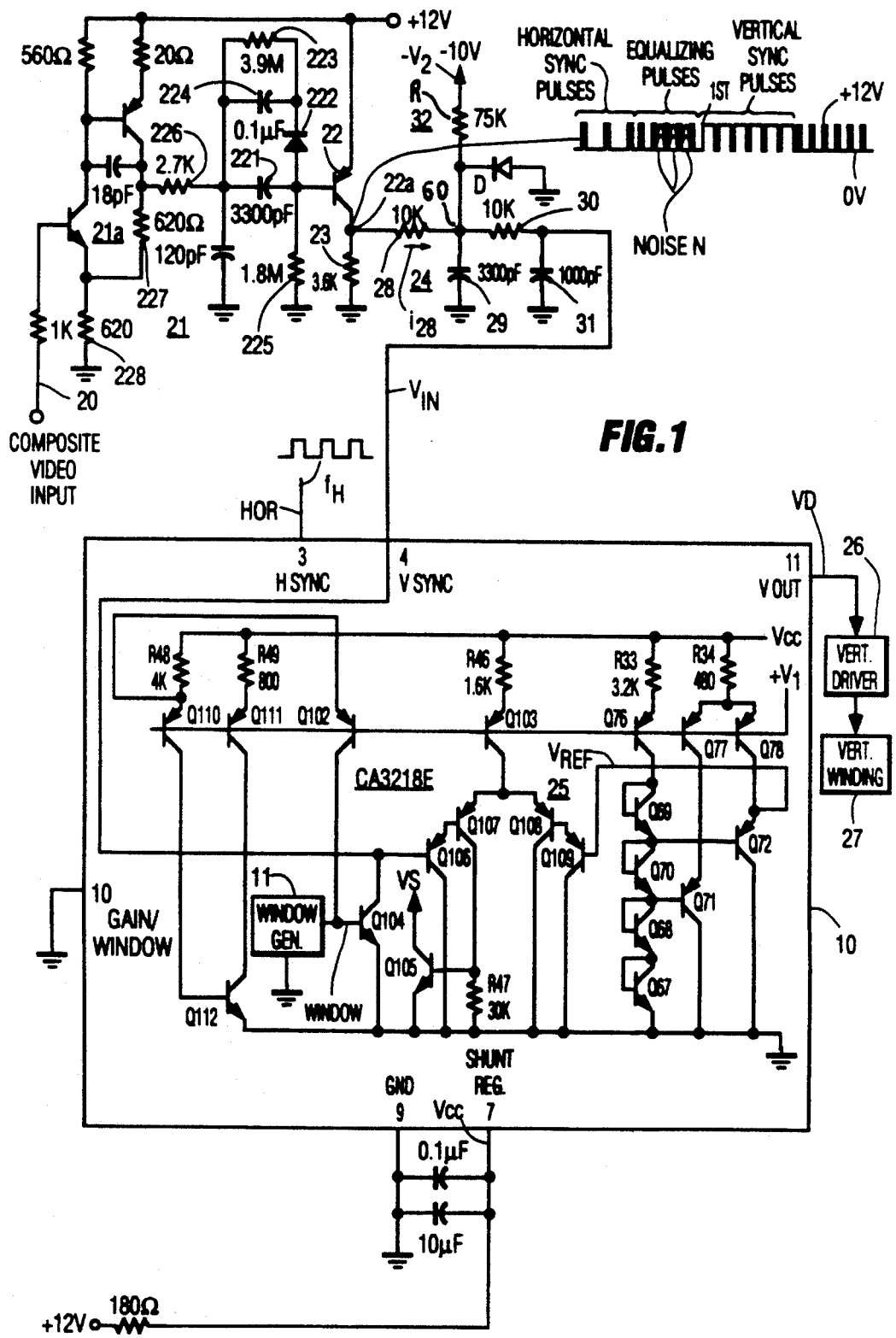

US005229854A

United States Patent [19]
Wilber

[11] Patent Number: 5,229,854
[45] Date of Patent: Jul. 20, 1993

[54] VERTICAL SYNC SEPARATOR
[75] Inventor: James A. Wilber, Indianapolis, Ind.
[73] Assignee: Thomson Consumer Electronics, Inc., Indianapolis, Ind.
[21] Appl. No.: 701,736
[22] Filed: May 17, 1991
[51] Int. Cl.$^5$ ............................................. H04N 5/10
[52] U.S. Cl. .................................... 358/154; 358/155
[58] Field of Search .............................. 358/153, 154

[56] References Cited

U.S. PATENT DOCUMENTS 5,031,041  7/1991  Fling .................................... 358/154

FOREIGN PATENT DOCUMENTS 0034382  3/1980  Japan ................................... 358/153

OTHER PUBLICATIONS

Gibson & Schroeder; "Noise Immune Vertical Sync Separator"; Nov. 1959.
Data information for integrated circuit RCA CA3218E, dated 1985.
Report CER-105 entitled Television Sync Separator Design, prepared by M. Giles, and published by Motorola Co.

*Primary Examiner*—Alvin E. Oberley
*Assistant Examiner*—Minsun Oh
*Attorney, Agent, or Firm*—Joseph S. Tripoli; Joseph J. Laks; Sammy S. Henig

[57] ABSTRACT

In a vertical sync separator, a composite sync signal in which picture information is removed is coupled via a low-pass filter to an input terminal of a comparator having a predetermined threshold level. The comparator produces an output signal when a voltage at the input terminal is more positive than the threshold level, that is indicative of the occurrence of a vertical sync pulse. When any of equalizing and horizontal sync pulses occurs, the comparator output signal is not produced. A negative current source is coupled to the low-pass filter to provide level shifting of the comparator input voltage so as to increase a guard band or noise immunity of the sync separator.

7 Claims, 2 Drawing Sheets

VERTICAL SYNC SEPARATOR

This invention relates to a circuit for detecting a vertical synchronizing signal from a television signal.

A composite baseband television signal, such as defined by the NTSC standard, contains video information, horizontal sync pulses, equalizing pulses and vertical sync pulses. The vertical sync pulses, in each vertical field interval, are preceded by the equalizing pulses. There are several consecutively occurring vertical sync pulses in each vertical field interval.

In a typical vertical synchronization signal separator, the composite television signal is first processed in a conventional stage that removes the video information, establishes a threshold level for detecting the sync pulses, referred to as a "slice" level for the sync pulses and produces a composite sync signal. The composite sync signal is coupled to an input of an R-C low-pass filter that produces a low-pass filtered signal at an input terminal of a comparator. An output signal at the vertical rate of the vertical synchronization signal separator is produced by the comparator.

The comparator may be included in an integrated circuit (IC) such as commercially available RCA CA3218E. In such IC, a threshold level at the input of the comparator has a predetermined value, determined by stacked diodes that are included inside the IC that is within a tolerance range of +2.1 and +2.8 volts.

When the composite television signal is free of noise and conforms to the television standard, such as NTSC, a peak voltage of each low-pass filtered pulse at the input terminal of the comparator, produced from a corresponding pulse of any of the horizontal sync and equalizing pulses, is smaller than the threshold level of the comparator. Therefore, a pulse in the output signal of the comparator is not produced. On the other hand, a peak voltage of the low-pass filtered pulse at the input terminal of the comparator, produced from, for example, the first vertical sync pulse to occur following the last equalizing pulse, exceeds the threshold voltage. Therefore, a pulse in the output signal of the comparator representative of the vertical sync pulse is produced.

The composite television signal received may be a non-standard signal. In such nonstandard television signal, for example, the sync pulses may have reduced amplitude relative to the amplitude of a luminance portion of the television signal, a situation that is sometimes referred to by the term compressed sync pulses. The television signal may contain sync-like pulses caused by noise producing signal sources, external to the television receiver. In either one of the aforementioned conditions in the television signal, in which a departure from the ideal condition described before occurs, the signal at the input terminal of the comparator may, disadvantageously, exceed the threshold voltage of the comparator prior to the occurrence of the first vertical sync pulse.

In accordance with an aspect of the invention the voltage developed at the input terminal of the comparator is level shifted such that an increase in the noise margin or guard band of the comparator is obtained.

In carrying out an inventive feature, a vertical synchronizing signal separator includes an arrangement for generating a composite synchronizing signal in which picture information is removed. A low-pass filter is responsive to the composite synchronizing signal for developing a low pass filtered signal at a first terminal, during an occurrence of a given vertical synchronizing pulse. A comparator is responsive to the low-pass filtered signal developed at the first terminal for generating an output signal that is indicative of the occurrence of the vertical synchronizing pulse. An arrangement coupled to the first terminal provides level-shifting of the low-pass filtered signal.

Figure 2A:
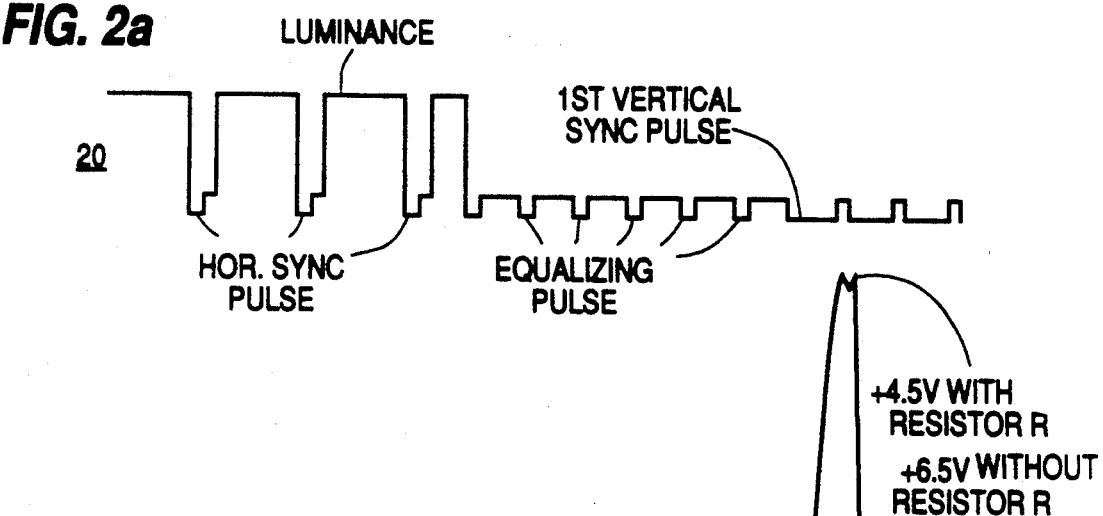
Figure 2B:
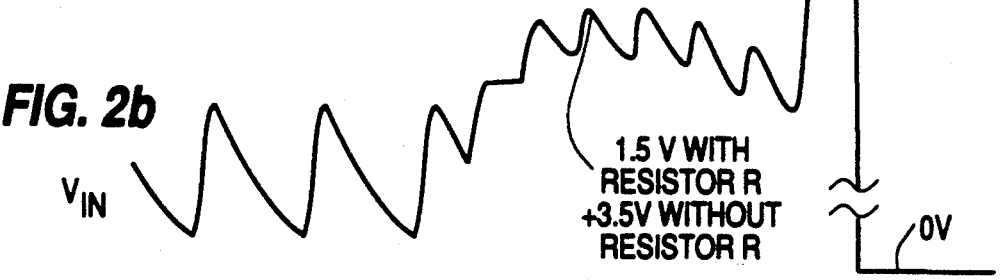

FIG. 1 illustrates, partially in detail schematic and partially in block diagram, a deflection system that includes a vertical sync separator, embodying an aspect of the invention, and FIGS. 2a and 2b illustrate waveforms useful for explaining the operation of the circuit of FIG. 1.

In FIG. 1, a composite baseband video signal 20, for example, of the NTSC standard, obtained from a conventional video detector, not shown, of a television receiver is coupled to a composite sync separator stage 21 that includes an output transistor 22. A supply voltage of +12 V is developed at the emitter of transistor 22. A collector electrode of transistor 22 is coupled to a collector load resistor 23 and to a low-pass filter 24.

Sync pulses of signal 20 are coupled from a sync amplifier stage 21a to a base of sync separator transistor 22 through a capacitor 221. During each negative going sync pulse, a charge in capacitor 221 is replenished by a current that flows via the emitter-base junction of transistor 22, capacitor 221 and resistors 226, 227 and 228. During each negative going sync pulse, transistor 22 is in saturation. During the interval that occurs between the sync pulses, capacitor 221 is slightly discharged via a resistor 225 and transistor 22 is nonconductive. The steady state voltage established across capacitor 221 determines a threshold of a "slice" level relative to a tip portion at an extreme end of each sync pulse. An arrangement of a diode 222 coupled in series with a parallel arrangement of a resistor 223 and a capacitor 224 is coupled in parallel with capacitor 221 for reducing a change in the slice level, during vertical sync pulses. The low energy content of the horizontal sync and equalizing pulses is insufficient to cause significant diode current in diode 222 and capacitor 224 is effectively isolated during the horizontal sync and equalizing pulses.

When any of the horizontal sync, equalizing and vertical sync pulses occurs, a pulse voltage of a peak level of approximately +12 volts is developed at the collector to form a composite sync signal 22a. Thus, stage 21 establishes sync slice level and eliminates video picture information from signal 22a, in a conventional manner. During, for example, a picture video portion of a given horizontal line, the collector voltage is zero. Signal 22a is coupled via low-pass filter 24 to a base electrode of a transistor Q106 of a comparator stage 25 included in an IC 10, of the RCA CA 3218E type.

IC 10, additionally, receives a signal HOR at the horizontal frequencies $f_H$ of approximately 16 $K_{Hz}$ from a conventional source, not shown, that is synchronized to the horizontal sync pulses of video signal 20. IC 10 includes a vertical countdown circuit, not shown. A vertical sync window generator 11 of IC 10 generates a pulse signal WINDOW during a window interval, starting at the 237th horizontal line and ending when, for example, the first vertical sync pulse is detected. Pulse signal WINDOW is coupled to a base electrode of a window enabling transistor Q104. Outside the window interval, the base of transistor Q106 is at ground potential because transistor Q104 is turned on. During the window interval, an input voltage $V_{IN}$ developed at pin 4 that is produced by filter 24 is developed at the base of transistor Q106.

A reference voltage $V_{REF}$ of comparator 25 is developed across series coupled, or stacked base-emitter junctions of transistors Q67, Q68, Q70 and Q72. When voltage $V_{IN}$ exceeds the threshold voltage of comparator 25, that is determined by voltage $V_{REF}$, a transistor Q107 of comparator 25 becomes nonconductive and produces an output pulse VS at a collector electrode of a transistor Q105. The threshold voltage comparator 25 has a tolerance range of between 2.1 to 2.8 volts.

Pulse VS is coupled to a stage that is included in IC 10, not shown, to produce a vertical drive signal VD that is coupled to a vertical driver stage 26. Stage 26 produces a vertical deflection current in a vertical deflection winding 27 that is synchronized to pulse VS; hence, also synchronized to the vertical sync pulse of composite baseband video signal 20. Circuit components and supply voltages are selected in such a way that pulse VS is produced during the first vertical sync pulse to occur among the consecutively occurring vertical sync pulses in a given vertical field interval.

Filter 24 includes resistors 28 and 30, coupled in series. Filter 24 also includes a filter capacitor 29, coupled between ground and a junction terminal 60 between resistors 28 and 30, and a capacitor 31, coupled between ground and pin 4 of IC 10.

A negative current source 32, embodying an aspect of the invention, includes a resistor R coupled between a source of a negative supply voltage $-V_2$ of $-10$ volts and junction terminal 60.

When composite video signal 20 is free of noise and conforms to the standard, such as NTSC, a peak voltage of each low-pass filtered pulse at the input terminal of comparator 25, pin 4, produced from a corresponding pulse of any of the horizontal sync and equalizing pulses is smaller than the threshold level of comparator 25. Therefore, pulse VS is not produced. On the other hand, a peak voltage of a low-pass filtered pulse at the input terminal of the comparator, produced from the first vertical sync pulse to occur exceeds the threshold voltage, and pulse VS of comparator 25 is produced.

FIG. 2a illustrates a waveform of a portion of video signal 20 that is a non-standard signal. The sync pulses are at a magnitude of 20 IRE and the luminance signal is at a magnitude of 100 IRE. In such non-standard signal, the magnitude of the sync pulse relative to that of the luminance signal is smaller than in the standard signal. FIG. 2b illustrates the waveform of the corresponding portion of voltage $V_{IN}$. Similar symbols and numerals in FIGS. 1, 2a and 2b indicate similar items or functions.

With such non-standard signal 20 of FIG. 2a, the slice level established in stage 21 of FIG. 1 is established further away from the sync top or closer to a pedestal of the sync pulse than when signal 20 is a standard signal. The result is that the width of a given one of the pulses of signal 22a at the collector of transistor 22 is greater than when signal 20 is a standard signal. Assume, for explanation purposes, that resistor R that is coupled to voltage $-V_2$ were not included in the circuit of FIG. 1. Therefore, with such non-standard signal, the peak level of voltage $V_{IN}$ produced by the equalizing pulses would be at a peak level of +3.5 volts, as shown in FIG. 2b. Since the tolerance range of comparator 25 of FIG. 1 is between +2.1 and +2.8 volts, as a result of the equalizing pulses, comparator 25 would, disadvantageously, produce pulse VS prior to the occurrence of the vertical sync pulse.

By including resistor R2 and voltage $-V_2$ in the circuit of FIG. 1, in accordance with an inventive feature, the peak level of voltage $V_{IN}$ produced by the equalizing pulse is level shifted and attains a peak level of +1.5 volts, as shown in FIG. 2b. Therefore, advantageously, level shifted voltage $V_{IN}$ is below the threshold level of comparator 25, when the equalizing pulses occur.

Furthermore, a noise signal that may be caused by undesirable signal generators located in the vicinity of the television receiver may produce sync-like pulses N in signal 22a. Without resistor R and voltage $-V_2$, pulses N might produce a peak amplitude of voltage $V_{IN}$ that, disadvantageously, exceeds the threshold voltage of comparator 25, prior to the occurrence of the first vertical sync pulse, even when signal 20 is a standard television signal.

During the first vertical sync pulse, voltage $V_{IN}$ of FIG. 2b attains a peak level that exceeds the threshold level of comparator 25 of FIG. 1. After voltage $V_{IN}$ exceeds the threshold level of comparator 25, window generator 11 causes transistor Q104 to turn on. The result is that voltage $V_{IN}$ of FIG. 2b becomes zero.

As a result of the level shifting in voltage $V_{IN}$ produced by resistor R and voltage $-V_2$, an increase in the noise margin or guard-band of comparator 25 is obtained. Therefore, the tendency of voltage $V_{IN}$, developed from the noise related sync-like pulses at the input of the comparator 25, to exceed the minimum threshold level of +2.1 volt of comparator 25, as a result of noise, is, advantageously, reduced. Advantageously, resistor R does not produce a significant attenuation of the peak-to-peak amplitude of the portion of voltage $V_{IN}$ that is produced by the vertical sync pulses.

A diode D is used to clamp voltage $V_{IN}$ to approximately zero volts to prevent a negative voltage of a significant magnitude from developing in the absence of video signal 20 at pin 4 of IC 10. Such negative voltage that could have been produced by voltage $-V_2$ might have caused a latch-up in IC 10. By having resistor 30 of filter 24 coupled between diode D and pin 4 of IC 10, advantageously smaller negative current can flow via pin 4 than if diode D were coupled between pin 4 and resistor 30.

What is claimed is:

1. A vertical synchronizing signal separator responsive to a composite video signal containing vertical synchronizing pulses, comprising: means responsive to said video signal for generating a composite synchronizing signal in which picture information of said video signal is removed;
   a low-pass filter responsive to said composite synchronizing signal for developing a low pass filtered signal at a first terminal, during an occurrence of a given vertical synchronizing pulse;
   a comparator responsive to said low-pass filtered signal developed at said first terminal for generating an output signal that is indicative of the occurrence of said vertical synchronizing pulse, in accordance with a difference between said low-pass filtered signal and a threshold level of said comparator; and
   means coupled to said first terminal for level-shifting said low-pass filtered signal, wherein said low-pass filtered signal changes in a first direction, during the occurrence of said vertical sync pulse, and wherein said level shifting means level shifts said low-pass filtered signal in a direction that is opposite to said first direction.

2. A vertical synchronizing signal separator responsive to a composite video signal containing vertical synchronizing pulses, comprising:

means responsive to said video signal for generating a composite synchronizing signal in which picture information of said video signal is removed;

a low-pass filter responsive to said composite synchronizing signal for developing a low pass filtered signal at a first terminal, during an occurrence of a given vertical synchronizing pulse;

a comparator responsive to said low-pass filtered signal developed at said first terminal for generating an output signal that is indicative of the occurrence of said vertical synchronizing pulse, in accordance with a difference between said low-pass filtered signal and a threshold level of said comparator; and means coupled to said first terminal for level-shifting said low-pass filtered signal, wherein said low-pass filter comprises a first resistor and said level-shifting means comprises a source of current coupled to said first resistor for developing in said first resistor a portion of said level shifted low-pass filtered signal, and wherein said source of current comprises a second resistor and a source of a supply voltage for generating a current that flows in said first and second resistors.

3. A vertical synchronizing signal separator responsive to a composite video signal containing vertical synchronizing pulses, comprising:

means responsive to said video signal for generating a composite synchronizing signal in which picture information of said video signal is removed;

a low-pass filter responsive to said composite synchronizing signal for developing a low pass filtered signal at a first terminal, during an occurrence of a given vertical synchronizing pulse;

a comparator responsive to said low-pass filtered signal developed at said first terminal for generating an output signal that is indicative of the occurrence of said vertical synchronizing pulse, in accordance with a difference between said low-pass filtered signal and a threshold level of said comparator; and means coupled to said first terminal for level-shifting said low-pass filtered signal in a manner to increase a guard band with respect to said threshold level of said comparator.

4. A vertical synchronizing signal separator responsive to a composite video signal containing vertical synchronizing pulses, comprising:

means responsive to said video signal for generating a composite synchronizing signal in which picture information of said video signal is removed;

a low-pass filter responsive to said composite synchronizing signal for developing a low pass filtered signal at a first terminal, during an occurrence of a given vertical synchronizing pulse;

a comparator responsive to said low-pass filtered signal developed at said first terminal for generating an output signal that is indicative of the occurrence of said vertical synchronizing pulse, in accordance with a difference between said low-pass filtered signal and a threshold level of said comparator;

means coupled to said first terminal for level-shifting said low-pass filtered signal; and means coupled to said first terminal for clamping a voltage level developed at said first terminal to prevent said voltage level from attaining a significant magnitude at a polarity that is opposite to that occurring when said vertical sync pulse occurs.

5. A vertical synchronizing signal separator according to claim 4 wherein said low-pass filter comprises a first resistor and wherein said first resistor is coupled between said first terminal and said clamping means.

6. A vertical synchronizing signal separator responsive to a composite video signal containing vertical synchronizing pulses, comprising:

means responsive to said video signal for generating a composite synchronizing signal in which picture information of said video signal is removed;

a low-pass filter responsive to said composite synchronizing signal for developing a low pass filtered signal at a first terminal, during an occurrence of a given vertical synchronizing pulse;

a comparator responsive to said low-pass filtered signal developed at said first terminal for generating an output signal that is indicative of the occurrence of said vertical synchronizing pulse, in accordance with a difference between said low-pass filtered signal and a threshold level of said comparator; and means coupled to said first terminal for increasing a guard band with respect to said threshold level of said comparator, during the occurrence of said vertical synchronizing pulse.

7. A vertical synchronizing signal separator according to claim 6 wherein said low-pass filter comprises a first resistor and wherein said means coupled to said first terminal for increasing said guard band comprises a source of current coupled to said first resistor for developing in said first resistor a portion of said level shifted low-pass filtered signal.

* * * * *